(12) United States Patent
Ueda

(10) Patent No.: US 10,334,159 B2
(45) Date of Patent: Jun. 25, 2019

(54) CORRECTING AND VERIFYING METHOD, AND CORRECTING AND VERIFYING DEVICE

(71) Applicant: PANASONIC CORPORATION, Osaka (JP)

(72) Inventor: Junko Ueda, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 191 days.

(21) Appl. No.: 15/322,586

(22) PCT Filed: Jul. 14, 2015

(86) PCT No.: PCT/JP2015/003548
§ 371 (c)(1),
(2) Date: Dec. 28, 2016

(87) PCT Pub. No.: WO2016/021121
PCT Pub. Date: Feb. 11, 2016

(65) Prior Publication Data
US 2017/0134644 A1    May 11, 2017

(30) Foreign Application Priority Data
Aug. 5, 2014  (JP) .................................. 2014-159546

(51) Int. Cl.
*G06T 1/00*    (2006.01)
*H04N 5/232*   (2006.01)
(Continued)

(52) U.S. Cl.
CPC ..... *H04N 5/23222* (2013.01); *G06K 9/00348* (2013.01); *G06K 9/00724* (2013.01);
(Continued)

(58) Field of Classification Search
CPC ............ H04N 5/23222; H04N 5/23203; G06T 7/246; G06T 3/40; G06T 7/20;
(Continued)

(56) References Cited

U.S. PATENT DOCUMENTS

2008/0060034 A1 * 3/2008 Egnal ..................... G01C 11/02
725/105
2008/0152192 A1 * 6/2008 Zhu .................... G06K 9/00771
382/103
(Continued)

FOREIGN PATENT DOCUMENTS

JP    2004-046647    2/2004
JP    2009-080660    4/2009
(Continued)

OTHER PUBLICATIONS

Hironobu Abe et al., "Efficient Video Hypermedia Authoring Based on Combination of Automatic Tracking and Manual Editing", The Journal of the Institute of Image Electronics Engineers of Japan, vol. 32, No. 5, The Institute of Image Electronics Engineers of Japan, Sep. 25, 2003, pp. 635-645 (with partial English language translation of pp. 638-639).
(Continued)

*Primary Examiner* — Howard D Brown, Jr.
(74) *Attorney, Agent, or Firm* — Greenblum & Bernstein, P.L.C.

(57) ABSTRACT

A correcting and verifying method and a correcting and verifying device cause a processor to display a specific frame image as a frame image to be confirmed based on a tracking result of a moving body in each of a plurality of frame images which configure a video, and to correct a position of the moving body in the frame image to be confirmed in a case where a correction instruction of a user is received.

22 Claims, 12 Drawing Sheets

(51) Int. Cl.
*G06T 7/20* (2017.01)
*G06K 9/00* (2006.01)
*G06K 9/46* (2006.01)
*G06K 9/52* (2006.01)
*G06T 3/40* (2006.01)
*G06T 7/246* (2017.01)
*G06K 9/66* (2006.01)

(52) U.S. Cl.
CPC ............ *G06K 9/4671* (2013.01); *G06K 9/52* (2013.01); *G06T 3/40* (2013.01); *G06T 7/20* (2013.01); *G06T 7/246* (2017.01); *H04N 5/23203* (2013.01); *G06K 9/66* (2013.01); *G06K 2009/4666* (2013.01); *G06T 2207/10016* (2013.01); *G06T 2207/20092* (2013.01); *G06T 2207/30224* (2013.01); *G06T 2207/30241* (2013.01)

(58) Field of Classification Search
CPC . G06T 2207/30241; G06T 2207/30224; G06T 2207/20092; G06T 2207/10016; G06K 9/00724; G06K 9/00348; G06K 9/4671; G06K 9/52; G06K 2009/4666; G06K 9/66
See application file for complete search history.

(56) References Cited

U.S. PATENT DOCUMENTS

| | | | |
|---|---|---|---|
| 2014/0241619 A1* | 8/2014 | Yoo | G06K 9/00771 382/159 |
| 2015/0248917 A1* | 9/2015 | Chang | H04N 21/8549 386/282 |
| 2016/0343147 A1* | 11/2016 | Nukaga | G06K 9/4671 |

FOREIGN PATENT DOCUMENTS

| | | | | |
|---|---|---|---|---|
| JP | 2009080660 | * | 4/2009 | ............ G06T 7/20 |
| JP | 2009-266155 | | 11/2009 | |
| JP | 2009266155 | * | 11/2009 | ............ G06T 7/20 |
| WO | 2011/084130 A1 | | 7/2011 | |

OTHER PUBLICATIONS

International Search Report, dated Sep. 29, 2015 by the Japan Patent Office (JPO), in corresponding International Application No. PCT/JP2015/003548.

The Extended European Search Report, dated Jul. 4, 2017, for the related European Patent Application No. 15829298.7.

* cited by examiner

FIG. 12
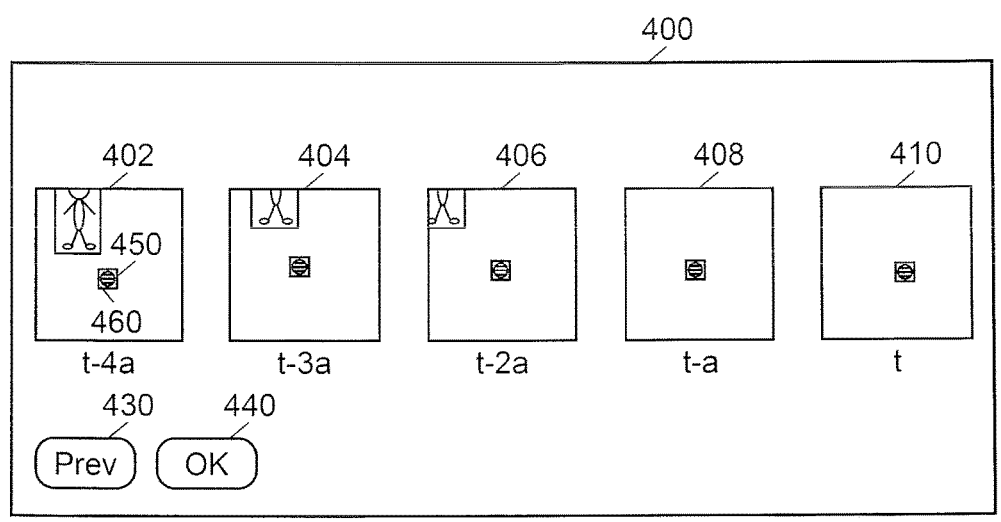
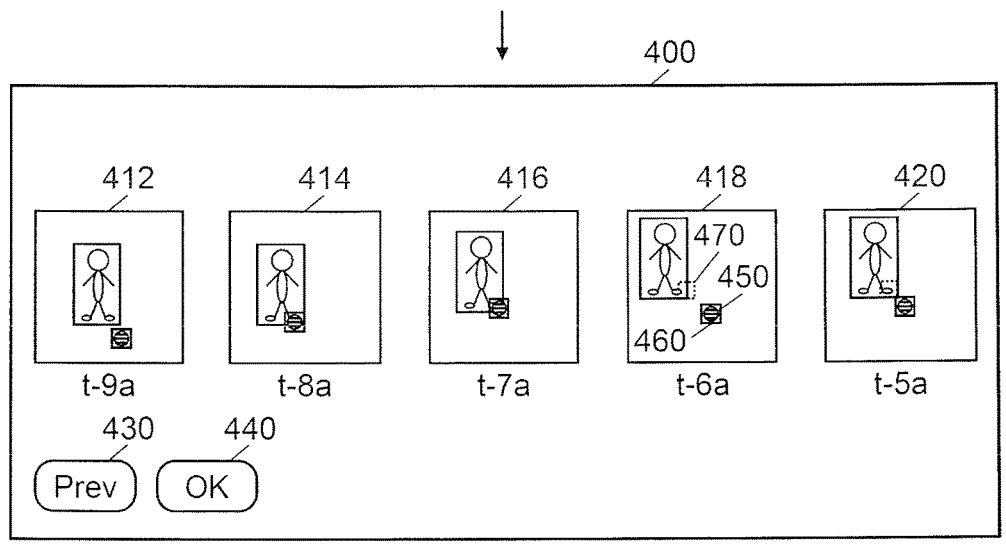

CORRECTING AND VERIFYING METHOD, AND CORRECTING AND VERIFYING DEVICE

TECHNICAL FIELD

The present disclosure relates to a correcting and verifying method, and a correcting and verifying device.

BACKGROUND ART

In the related art, a moving body tracking device which tracks a moving body in a video is known. For example, in a technique described in PTL 1, a prediction position of the moving body in a present frame image is obtained based on positional information of the moving body in a past frame image. Candidate objects having a specific predetermined feature in the moving body are extracted from image data in the present frame image and the candidate object closer to the prediction position among the extracted candidate objects is allocated as a moving body.

CITATION LIST

Patent Literature

PTL 1: Japanese Patent Unexamined Publication No. 2004-46647

SUMMARY OF THE INVENTION

However, in the technique disclosed in PTL 1, there is a problem in that a moving body to be tracked is tracked by mistake with the other moving body in some cases. For example, in a sport game using a ball (moving body) such as a soccer game, it is difficult to track the ball compared to track a player. That is, since a color or a shape of the ball is similar to a foot (shoes) of the player, when the ball approaches the foot of the player, an error in tracking occurs. Furthermore, there is a case where the ball is concealed by the player. In this case, it is difficult to accurately track the ball. Accordingly, a user confirms whether the moving object to be tracked in each of the frame images is correctly tracked, and it is necessary to perform correcting in a case where the moving body is tracked by mistake. Therefore, it takes a time and labor for the work of the confirmation and the correction.

An object of the present disclosure is to provide a correcting and verifying method and a correcting and verifying device which can reduce work load when confirming and correcting a position of a moving body to be tracked in a frame image.

In a correcting and verifying method according to the present disclosure, a processor displays a specific frame image as a frame image to be confirmed based on a tracking result of a moving body in each of a plurality of frame images which configure a video. In a case where a correction instruction of a user is received, the processor corrects a position of the moving body in the frame image to be confirmed.

In a correcting and verifying device, a processor displays a specific frame image as a frame image to be confirmed based on a tracking result of a moving body in each of a plurality of frame images which configure a video. The processor receives a correction instruction of a user, and in a case where the correction instruction is received from the operation receiver, corrects the position of the moving body in the frame image to be confirmed.

According to the present disclosure, work load when confirming and correcting a position of a moving body to be tracked in a frame image can be reduced.

BRIEF DESCRIPTION OF DRAWINGS

FIG. 12 is a diagram illustrating the searching result screen in the present exemplary embodiment.

DESCRIPTION OF EMBODIMENT

Figure 1:
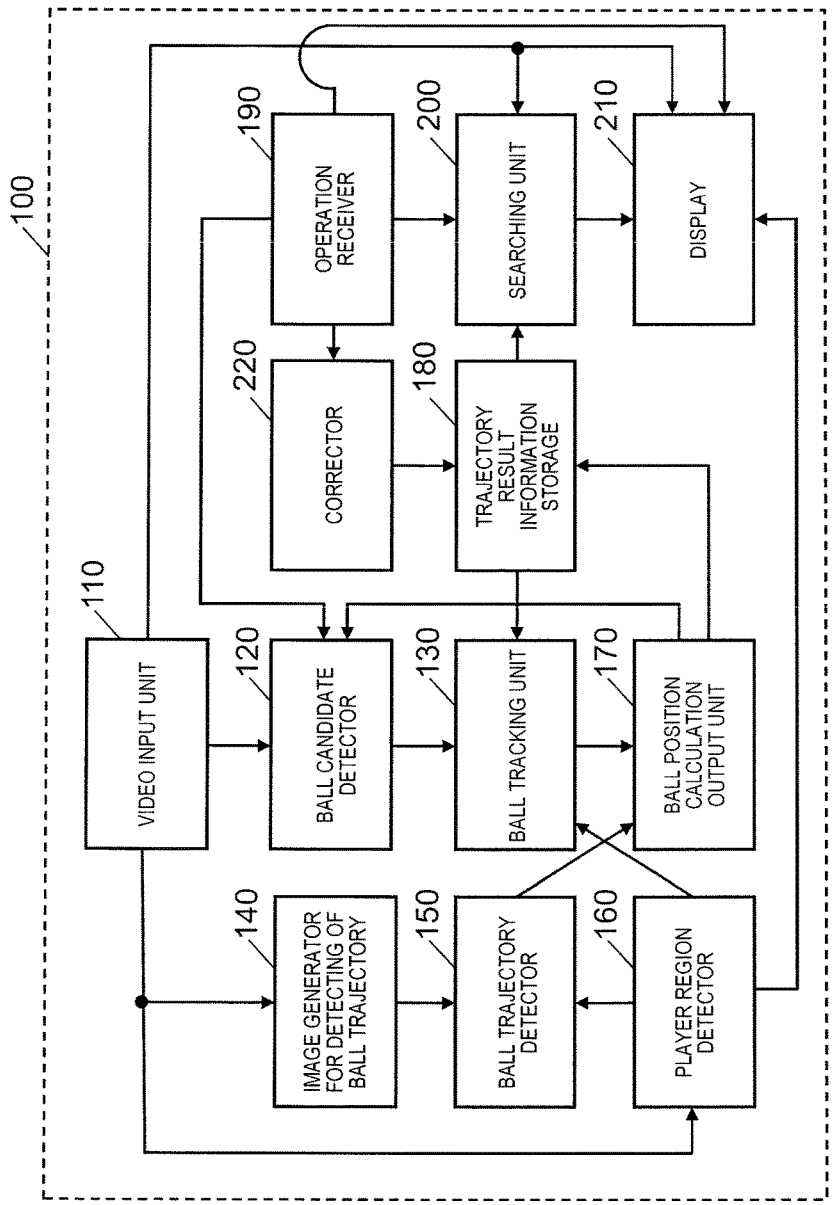
FIG. 1 is a diagram illustrating a functional configuration of a correcting and verifying device in the present exemplary embodiment.

Hereinafter, the present exemplary embodiment will be described in detail based on drawings. FIG. 1 is a diagram illustrating a functional configuration of correcting and verifying device 100 according to an exemplary embodiment of the present disclosure. Correcting and verifying device 100 tracks a ball (moving body) in a video input from an outside, that is, detects a position of a ball in each of a plurality of frame images which configures the video, and searches and displays a frame image (hereinafter, referred to as a "frame image to be confirmed") which is desired to confirm a position detection result of a ball from the plurality of frame images based on the position detection result. In addition, correcting and verifying device 100 corrects the position detection result of the ball in the frame image to be confirmed in a case where a correction instruction of a user is received. In the present exemplary embodiment, correcting and verifying device 100 tracks the ball to be used in a soccer game, in a sport video in which the soccer game that is one of sports games is imaged.

Correcting and verifying device 100 includes video input unit 110, ball candidate detector 120, ball tracking unit 130, image generator for detecting of ball trajectory 140, ball trajectory detector 150, player region detector 160, ball position calculation output unit 170, tracking result information storage 180, operation receiver 190, searching unit 200, display 210, and corrector 220.

Although not illustrate, correcting and verifying device 100 includes, for example, a central processing unit (CPU) as a processor, a storage medium such as a read only memory (ROM) which stores a control program, a working memory such as a random access memory (RAM), and a communication circuit. In this case, functions of each of the above-described parts are obtained by executing the control program through the CPU.

Video input unit 110 inputs a sport video which is configured of the plurality of frame images from an external device (computer), for example. Video input unit 110 outputs the input sport video to ball candidate detector 120, image generator for detecting of ball trajectory 140, player region detector 160, searching unit 200, and display 210.

In each of the plurality of frame images which configure the sport video output from video input unit 110, ball candidate detector 120 detects a region having a high possibility of presence of the ball to be used in the soccer game as a ball candidate region. Ball candidate detector 120 outputs a position in a frame image of the detected ball candidate region and the frame image to ball tracking unit 130.

Figure 2:
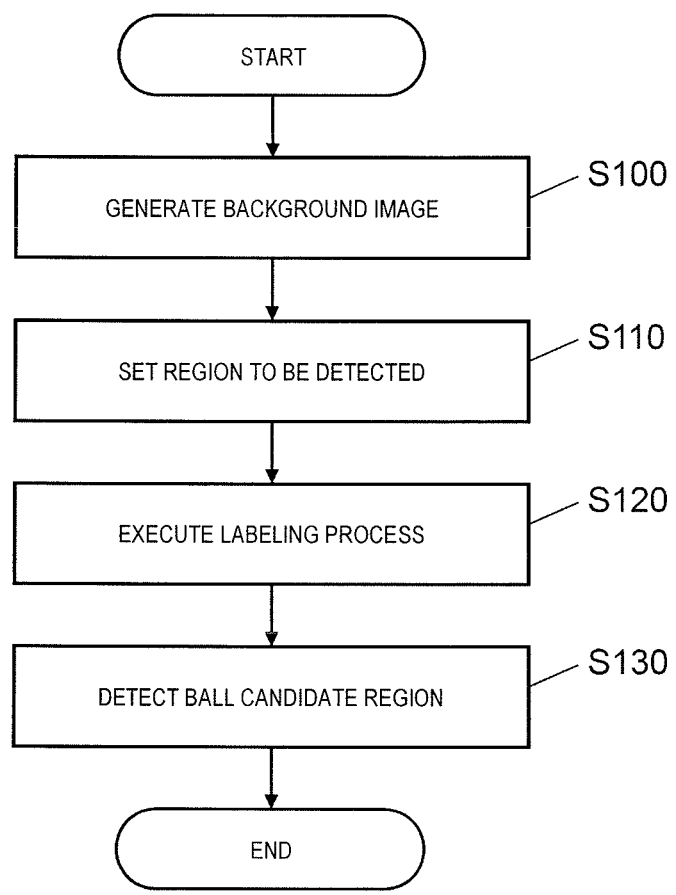
FIG. 2 is a flow chart illustrating a ball candidate detecting operation in the present exemplary embodiment.

Next, a detailed ball candidate detecting operation by ball candidate detector 120 will be described. FIG. 2 is a flow chart illustrating the ball candidate detecting operation in the present exemplary embodiment.

Firstly, ball candidate detector 120 generates the background image which configures the sport video output from the frame image output from video input unit 110 (step S100). Here, the background image is a binary image in which the pixel value of the pixel which configures the background portion among the frame images is set to 0 (black) and the pixel value of the pixel which configures the background portion is set to 255 (white). As a method for generating the background image, various types of methods are included, for example, a well-known background differencing technique, an inter-frame differencing technique, or the like is included.

Next, ball candidate detector 120 sets the region to be detected for detecting the region of the ball candidate, among the generated background images (step S110). Specifically, ball candidate detector 120 calculates a movement prediction position of the ball in the background image based on ball position information output from ball position output unit 170 for last frame image, and set the region having a certain size which uses the movement prediction position as a center, as the region to be detected. Although the process for setting the region to be detected is not necessarily essential, by setting the region to be detected, a process load of the ball candidate detecting operation can be reduced compared to a case where the all of the regions of the background image is set as the region to be detected.

Next, ball candidate detector 120 executes the labeling process with respect to the region set in the background images (step S120). Here, the labeling process is a process that a portion having 255 (white) of a pixel value is allocated to the continuous pixel with the same number.

Finally, ball candidate detector 120 obtains the size (for example, the region width, the region height, horizontal to vertical ratio or background ratio within the rectangle that circumscribes the pixel region, or the like) of the pixel region which is allocated with the same number and detects the pixel region in which the obtained size satisfies a predetermined condition as the ball candidate region (step S130). The predetermined condition is an upper limit of the region width and the region height, upper and lower limits of the horizontal to vertical ratio, a lower limit of the background ratio within the rectangle that circumscribes the pixel region, or the like. Ball candidate detector 120 outputs the position (X coordinate and Y coordinate) in the frame image of the detected ball candidate region, the region width, the region height, and the frame image to ball tracking unit 130. By finishing the process in step S130, ball candidate detector 120 terminates the process in FIG. 2.

In each of the plurality of frame images which configure the sports video output from video input unit 110, player region detector 160 detects a region having a high possibility of presence of the player who is participating in the soccer game as a player candidate region. Player region detector 160 calculates player likelihood based on a feature amount of the detected player candidate region. Here, the player likelihood is a measure quantitatively indicating how likely the player candidate region is to be the region in which the player is actually present. Player region detector 160 determines whether the player likelihood of the player candidate region is equal to or more than a predetermined threshold value, and in a case where the player likelihood is equal to or more than the predetermined threshold vale, outputs a range of the player candidate region as a player region to ball tracking unit 130, ball trajectory detector 150, and display 210.

In the frame image output from ball candidate detector 120, ball tracking unit 130 calculates ball likelihood based on a feature amount of the ball candidate region. Here, the ball likelihood is a measure quantitatively indicating how likely the ball candidate region is to be the region in which the ball is actually present. The feature amount is calculated based on the position, the region width, and the region height in the frame image of the ball candidate region output from ball candidate detector 120. The feature amount may use the feature amount using an optical feature amount of the frame image. Ball tracking unit 130 determines whether the ball likelihood of the ball candidate region is equal to or more than a predetermined threshold value, and in a case where the ball likelihood is equal to or more than the predetermined threshold vale, detects the position of the ball candidate region as a first ball position. In a case where the plurality of ball candidate regions are present in the frame image output from ball candidate detector 120, ball tracking unit 130 calculates the ball likelihood for each of the plurality of ball candidate regions, and detects the position of the ball candidate region in which has the predetermined threshold value or more and having a higher ball likelihood as the first ball position. Ball tracking unit 130 outputs a frame number of the frame image, the first ball position, the ball likelihood, and a region width and a region height of the ball candidate region to ball position calculation output unit 170.

In addition, in a case where the calculated ball likelihood is less than the predetermined threshold value, ball tracking unit 130 outputs an indication that the frame number of the frame image, the region width and the region height of the ball candidate region, and the first ball position cannot be detected to ball position calculation output unit 170.

In addition, in a case where the position of the ball candidate region in the frame image is included in an overlapping determination region which is set outside the player region output from player region detector 160, that is, in a case where the ball is positioned around the player, ball tracking unit 130 outputs the frame number of the frame image, the region width and the region height of the ball candidate region, and the indication that a shielding (overlapping) of the ball is generated by the player to ball position calculation output unit 170. Each of the region width and the region height of the overlapping determination region is 1.5 times the region width and the region height of the player region, respectively, for example.

In addition, in a case where the position of the ball candidate region in the last frame image is included in the overlapping determination region, and the position of the ball candidate region in a current frame image is included in a re-detection determination region set at the outside the overlapping determination region, ball tracking unit 130 outputs the indication that the frame number of the frame image, the position of the ball candidate region, the region width and the region height, the position of the ball candidate region, the region width and the region height, and the position of the ball candidate region are included in the re-detection determination region to ball position calculation output unit 170. The region width and the region height of the re-detection determination region is twice the region width and the region height of the player region, for example.

Image generator for detecting of ball trajectory 140 inputs the sports video output from video input unit 110, and generates an image for detecting a ball trajectory for detecting the trajectory of the ball in the plurality of (in the present exemplary embodiment, a natural number N) of the frame image units. Image generator for detecting of ball trajectory 140 outputs the generated image for detecting a ball trajectory to ball trajectory detector 150.

Figure 3:
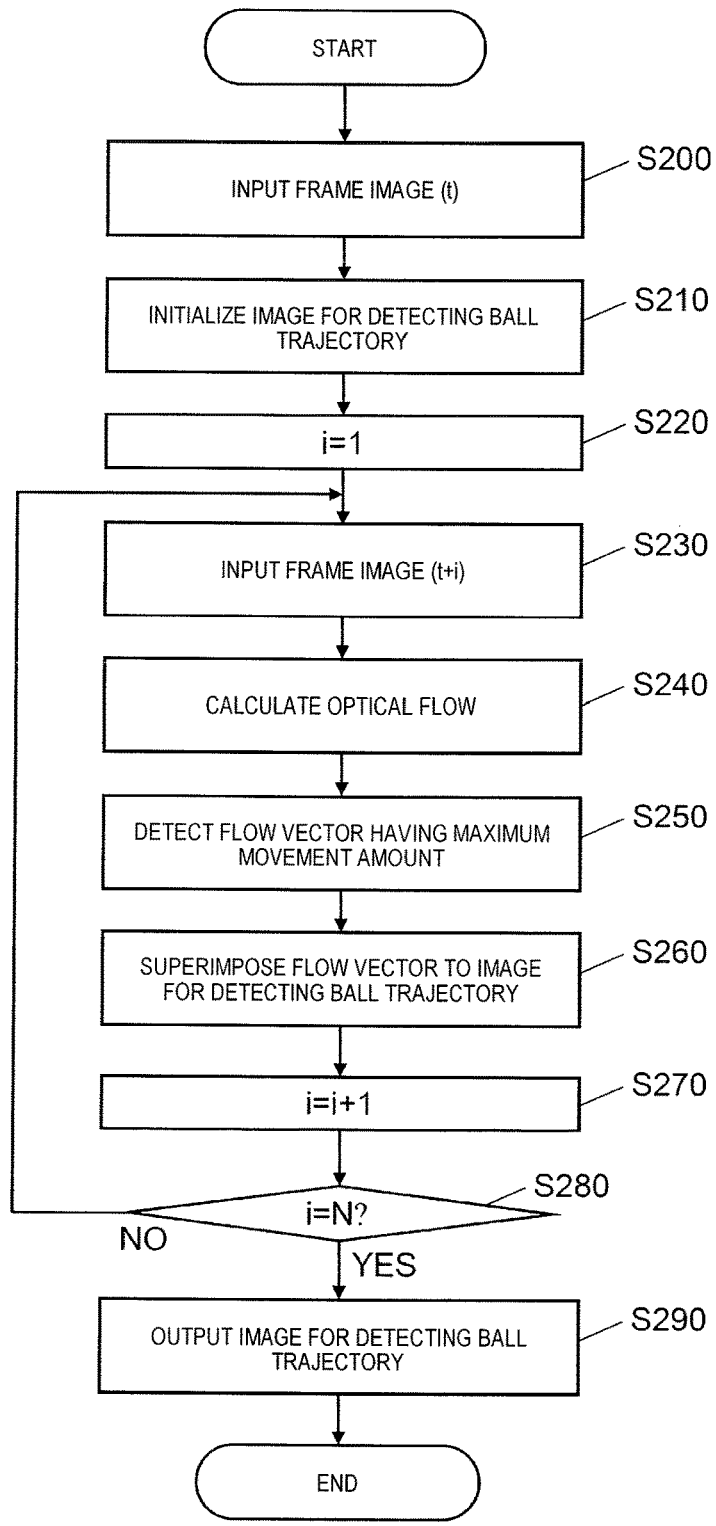
FIG. 3 is a flow chart illustrating an image generating operation for detecting a ball trajectory in the present exemplary embodiment.

Next, a detailed image for detecting a ball trajectory generating operation by image generator for detecting of ball trajectory 140 will be described. FIG. 3 is a flow chart illustrating an image generating operation for detecting a ball trajectory in the present exemplary embodiment.

Firstly, image generator for detecting of ball trajectory 140 inputs a frame image (t) which configures a sport video output from video input unit 110 (step S200). Here, the frame image (t) indicates a frame image having the frame number of t.

Next, image generator for detecting of ball trajectory 140 initializes the image for detecting a ball trajectory (step S210). Specifically, image generator for detecting of ball trajectory 140 prepares an image having the same size of the frame image (t) input in step S200 and set all of pixel values which configure the image to 0 (black).

Next, image generator for detecting of ball trajectory 140 sets a value of an indefinite number i to be used in the image generating operation for detecting a ball trajectory to 1 (step S220). Next, image generator for detecting of ball trajectory 140 inputs a frame image (t+i) which configures the sports video output from video input unit 110 (step S230).

Next, image generator for detecting of ball trajectory 140 calculates an optical flow using a frame image which is input in step S230 (for example, frame image (t+1), hereinafter, referred to as a "second frame image") and the frame image which is input before one frame (for example, frame image (t), hereinafter, referred to as a "first frame image") (step S240). Specifically, image generator for detecting of ball trajectory 140 obtains information that each pixel of the first frame image is moved to which pixel of the second frame image, that is, a flow vector.

Next, image generator for detecting of ball trajectory 140 detects the flow vector having a maximum movement amount among a lot of flow vectors based on the calculation result of step S240 (step S250). Next, image generator for detecting of ball trajectory 140 superimposes the image indicating a position (location) of the pixel corresponding to the flow vector detected in step S250 to the image for detecting a ball trajectory (step S260). Specifically, in the image for detecting a ball trajectory, image generator for detecting of ball trajectory 140 set the pixel value around the position of the pixel corresponding to the flow vector detected in step S250 to 255 (white). For example, a rectangular region having 5×5 pixel or a circle region having 5 pixel of a diameter to the around the position of the pixel corresponding to the flow vector, and a value of the pixels which configure these set regions are set to 255.

Next, image generator for detecting of ball trajectory 140 adds 1 to a value of the indefinite number i (step S270). Next, image generator for detecting of ball trajectory 140 determines whether the value of the indefinite number i is the same as N (step S280). As the result of the determination, in a case where the value of the indefinite number i is not the same as N (step S280, NO), the process returns to before step S230.

On the other hand, in a case where the value of the indefinite i is the same as N (step S280, YES), image generator for detecting of ball trajectory 140 outputs the position of the flow vector having a maximum movement amount between the image for detecting a ball trajectory, a frame image (t+N−2), and a frame image (t+N−1) to ball trajectory detector 150 (step S290). In the output image for detecting a ball trajectory, the image indicating the position of the pixel corresponding to the flow vector having the maximum movement amount is superimposed in only N frame image. By finishing the process of step S290, image generator for detecting of ball trajectory 140 terminates a process in FIG. 3.

Ball trajectory detector 150 detects the trajectory of the ball in the plurality (in the present exemplary embodiment, the natural number N) of frame image units based on the image for detecting a ball trajectory output from image generator for detecting of ball trajectory 140 and the player region output from player region detector 160. Ball trajectory detector 150 outputs the position of the flow vector output from image generator for detecting of ball trajectory 140 to ball position calculation output unit 170 as a second ball position.

Figure 4:
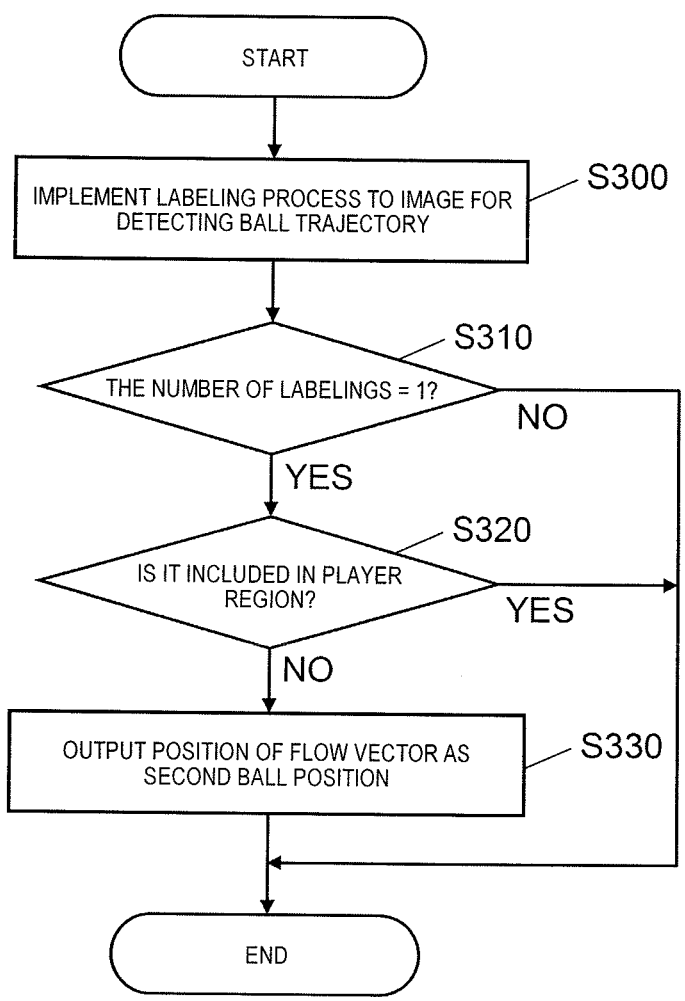
FIG. 4 is a flow chart illustrating a ball trajectory detecting operation in the present exemplary embodiment.

Next, the detailed ball trajectory detecting operation by ball trajectory detector 150 in the present exemplary embodiment will be described. FIG. 4 is a flow chart illustrating the ball trajectory detecting operation in the present exemplary embodiment.

Figure 5A:
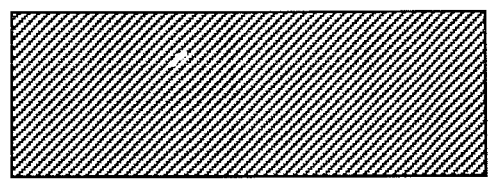
FIG. 5A is a diagram illustrating an image which is generated by superimposing maximum portions of a flow vector.
Figure 5B:
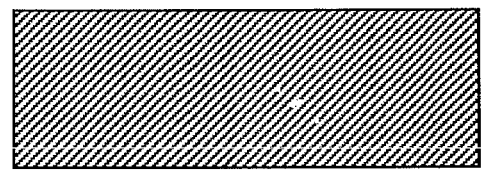
FIG. 5B is a diagram illustrating an image which is generated by superimposing maximum portions of a flow vector.

Firstly, ball trajectory detector 150 executes a labeling process with respect to the image for detecting a ball trajectory output from image generator for detecting of ball trajectory 140 (step S300). Next, as the result of the executing the labeling process, ball trajectory detector 150 determines whether the number of labelings in the image for detecting a ball trajectory is 1 (step S310). FIG. 5A illustrates an image for detecting a ball trajectory in a case where the labeling number is 1. As illustrated in FIG. 5A, in a case where the number of labeling is 1, in on the image for detecting a ball trajectory, a position of the pixel of white portion that is having a maximum movement amount is indicated such that the positions are connected in a time-series manner and the connected portion depicts the clear trajectory as the trajectory of the ball. FIG. 5B illustrates an image for detecting a ball trajectory in a case where the labeling number is 3. As a result of the determination, in a case where the number of the labelings in the image for detecting a ball trajectory is not 1 (step S310, NO), ball trajectory detector 150 terminates the process in FIG. 4.

On the other hand, in a case where the number of the labelings in the image for detecting a ball trajectory is 1 (step S310, YES), ball trajectory detector 150 determines whether the position of the flow vector output from image generator for detecting of ball trajectory 140 is included in the player region output from player region detector 160 (step S320). The determination process in step S320 is performed for preventing that the player running faster is wrongly detected as the trajectory of the ball.

As a result of the determination in step S320, in a case where the position of the flow vector output from image generator for detecting of ball trajectory 140 is included in the player region (step S320, YES), ball trajectory detector 150 determines that the trajectory of the ball cannot be detected and the process in FIG. 4 is terminated. On the other hand, in a case where the position of the flow vector output from image generator for detecting of ball trajectory 140 is not included in the player region (step S320, NO), ball trajectory detector 150 determines that the trajectory of the ball cannot be detected and outputs the position (X coordinate and Y coordinate) of the flow vector output from image generator for detecting of ball trajectory 140 to ball position calculation output unit 170 as the second ball position (step S330). By finishing the process of step S330, the process in FIG. 4 is terminated.

Figure 6:
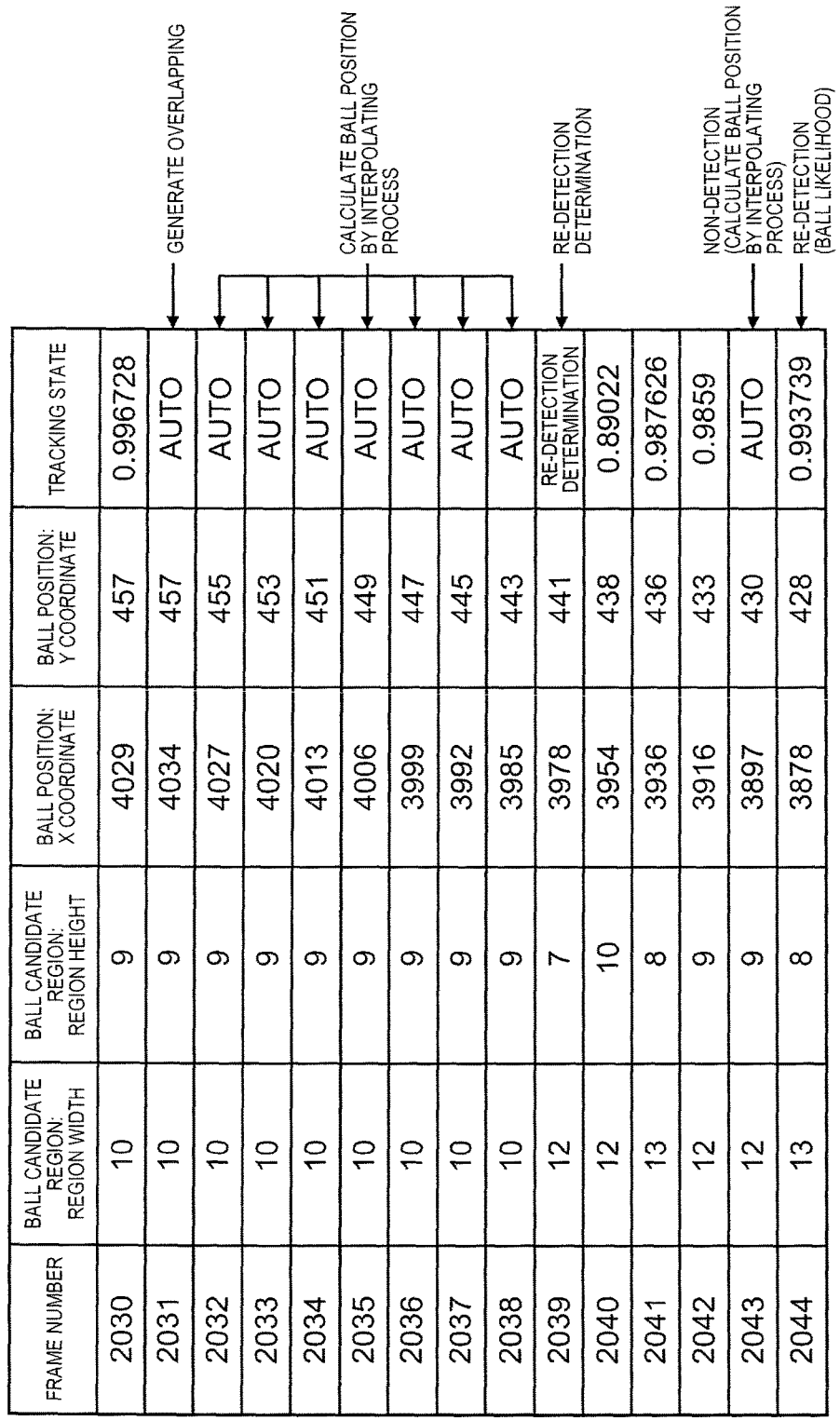
FIG. 6 is a diagram illustrating tracking result information in the present exemplary embodiment.

Ball position calculation output unit 170 generates tracking result information (corresponding to "detection result information" of the present disclosure) indicating a result in which the ball is detected in each of the frame images which configure the sport video based on information output from ball tracking unit 130 and ball trajectory detector 150 and records the generated tracking result information to tracking result information storage 180. As illustrated in FIG. 6, the tracking result information includes the frame number, the region width and the region height of the ball candidate region, the ball position (the X coordinate and the Y coordinate), and the tracking state as item information. Ball candidate detector 120 outputs the ball position in each of the frame images to ball candidate detector 120.

In a case where the both of the first ball position output from ball tracking unit 130 and the second ball position output from ball trajectory detector 150 are present in the frame image of a certain frame number, ball position calculation output unit 170 determines whether the difference between the first ball position and the second ball position is equal to or more than the predetermined value (for example, 3 pixels). In a case where a positional coordinate of the first ball position and the second ball position is defend as (X1, Y1) and (X2, Y2), the difference between the first ball position and the second ball position is calculated by Expression (1) below.

$$\text{Difference} = \text{SQR}((X2-X1)^2 + (Y2-Y1)^2) \quad (1)$$

As a result of the determination, in a case where the difference between the first ball position and the second ball position is less than the predetermined value, ball position calculation output unit 170 sets the positional coordinate of the first ball position to the ball position included in the tracking result information and sets the ball likelihood output from ball tracking unit 130 in a tracking state. On the other hand, in a case where the difference between the first ball position and the second ball position is equal to or more than the predetermined value, ball position calculation output unit 170 sets the positional coordinate of the second ball position in the ball position included in the tracking result information and sets a character string "TRAJECTORY" to the tracking state.

In a case where only the first ball position output from ball tracking unit 130 is present in the frame image of the certain frame number, ball position calculation output unit 170 sets the positional coordinate of the first ball position to the ball position included in the tracking result information and the sets the ball likelihood output from ball tracking unit 130 to the tracking state.

In a case where the indication that the overlapping is generated in the frame image of the certain number is output from ball tracking unit 130, ball position calculation output unit 170 set the positional coordinate of the ball position in the recent frame image in which the ball likelihood is set to the tracking state to the ball position included in the tracking result information and the set a character string "OVERLAP" is to the tracking state.

In a case where the indication that the position of the ball candidate region is included in the re-detection determination region for the frame image of the certain frame number is output from ball tracking unit 130, ball position calculation output unit 170 set the position of the ball candidate region output from ball tracking unit 130 to the ball position included in the tracking result information and the set a character string "RE-DETECTION DETERMINATION" to the tracking state.

In a case where the indication in which the first ball position cannot be detected for the frame image of the certain frame number is output from ball tracking unit 130, ball position calculation output unit 170 does not set the value to the ball position included in the tracking result information and set a character string "NON-DETECTION" to the tracking state.

In the present exemplary embodiment, ball position calculation output unit 170 refers the tracking result information. In a case where a portion in which the frame image in which the character string "RE-DETECTION DETERMINATION" is set to the tracking state is continued after the one or more frame images (frame image to be confirmed) in which the character string "OVERLAP" is set to the tracking state, the ball position in the frame image to be confirmed is calculated by the interpolating process using the ball position in before and after the frame image of the frame image to be confirmed. The calculation result is reflected to the tracking result information. In an example of FIG. 6, the character string "OVERLAP" is set to the tracking state in the frame images having the frame numbers of 2031 to 2038. However, each of the ball positions in the frame image having the frame numbers of 2031 to 2038 is calculated and set by the interpolating process using the ball position in the frame image having the frame number of 2030 and the ball position in the frame image having the frame number of 2039. Ball position calculation output unit 170 resets the tracking state in the frame image in which the ball position is calculated by the interpolating process from the character string "OVERLAP" to a character string "AUTO". The first ball position is calculated in also the frame image in which the character string "OVERLAP" is set to the tracking state. Thus, in a case where the difference between the first ball position and the second ball position is equal to or more than the predetermined value, as described above, ball position calculation output unit 170 resets the tracking state from the trajectory sting "OVERLAP" or "AUTO" to the character string "TRAJECTORY", in some cases.

In addition, in a case where the portion in which the frame images in which the ball likelihood is set to the tracking state are continued is present after the one or more frame images (frame image to be confirmed) in which the character string "NON-DETECTION" is set to the tracking state, ball position calculation output unit 170 calculates the ball position in the frame image to be confirmed by the interpolating process using the ball position in the before and after the frame image of the frame image to be confirmed by referring the tracking result information, and reflects the calculation result to the tracking result information. In an example of FIG. 6, the character string "NON-DETECTION" is set to the tracking state in the frame image having the frame number of 2043. However, the ball position in the frame image having the frame number of 2043 is calculated and set by the interpolating process using the ball position in the frame image having the frame number of 2042 and the ball position in the frame image having the frame number of 2044. Ball position calculation output unit 170 resets the tracking state in the frame image in which the ball position is calculated by the interpolating process from the character string "NON-DETECTION" to a character string "AUTO". The first ball position is set in also the frame image in which the character string "NON-DETECTION" is set to the tracking state at the coordinate same as the first ball position which is finally detected at the previous frame image. Thus, in a case where the difference between the first ball position and the second ball position is equal to or more than the predetermined value, as described above, ball position calculation output unit 170 resets the tracking state from the trajectory sting "NON-DETECTION" or "AUTO" to the character string "TRAJECTORY", in some cases.

Operation receiver 190 has an operation key such as a numeric keypad or a start key, searches and displays the frame image to be confirmed from the plurality of frame images which configures the sport video, and receives the various types of the input operations when correcting the ball position in accordance with the correction instruction of the user. In a case where the input operation is received, operation receiver 190 outputs the operation signal corresponding to the input operation to ball candidate detector 120, searching unit 200, display 210, and corrector 220.

Searching unit 200 refers the tracking result information stored in tracking result information storage 180 accordance with the operation signal output from operation receiver 190 and searches the frame image to be confirmed among the plurality of frame images which configure the sport video output from video input unit 110. Searching unit 200 outputs the frame number of the searched frame image to be confirmed to display 210.

Display 210 displays a searching screen for searching the frame image to be confirmed on a monitor (not illustrated) in accordance with the operation signal output from operation receiver 190. In addition, in a case where the frame number is output from searching unit 200, display 210 displays a searching result screen including the frame image to be confirmed corresponding to the frame number on the searching result screen.

In a case where the searching result screen is displayed by display 210, corrector 220 corrects the ball position in the frame image to be confirmed included in the searching result screen in accordance with the operation signal output from operation receiver 190. Corrector 220 updates the ball position included in the tracking result information stored in the tracking result information storage 180 by using the ball position after correcting.

Figure 7:
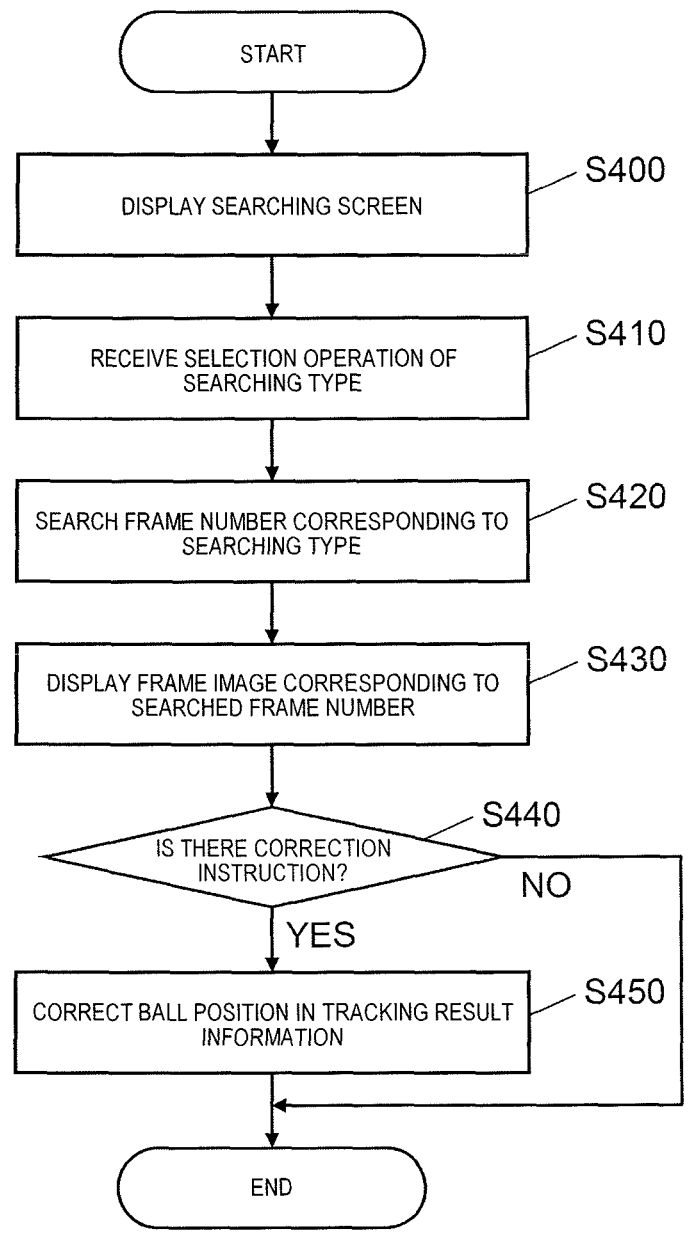
FIG. 7 is a flow chart illustrating a correcting and confirming operation in the present exemplary embodiment.

Next, a correction confirmation operation for correcting the ball position in the frame image to be confirmed according to the correction instruction of the user will be described. FIG. 7 is a flow chart illustrating a correcting and confirming operation in the present exemplary embodiment. A process in step S400 is started by receiving the input of a searching screen display operation for instructing a display of the searching screen by operation receiver 190.

Figure 8:
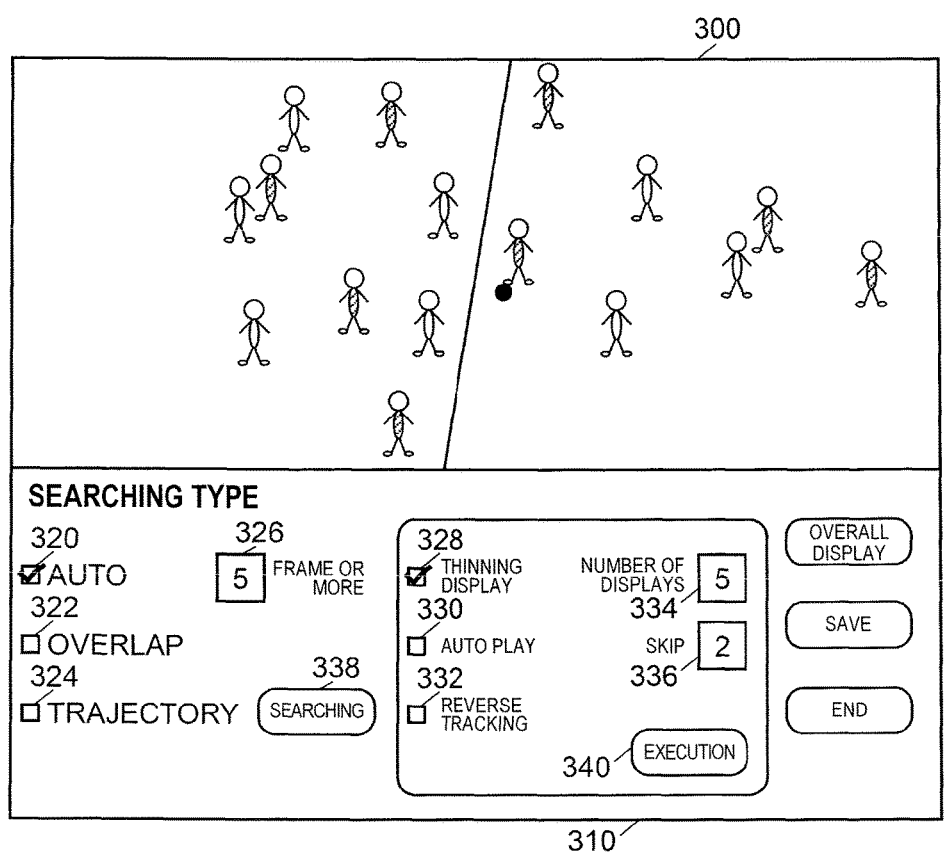
FIG. 8 is a diagram illustrating a searching screen in the present exemplary embodiment.

Firstly, display 210 inputs a searching screen display operation signal output from operation receiver 190 and displays the searching screen for searching the frame image to be confirmed on the monitor (step S400). FIG. 8 is a diagram illustrating a searching screen in the present exemplary embodiment.

The searching screen includes display region 300 reproduces and displays the sport video output from video input unit 110 and searching condition setting region 310 for setting a searching condition for searching the frame image to be confirmed. Check boxes 320 to 324 and 328 to 332, input boxes 326, 334, and 336, searching button 338, execution button 340, and the like are disposed in searching condition setting region 310.

Check box 320 is a check box for selecting "AUTO" as the searching type for searching the frame image to be confirmed. Check box 322 is a check box for selecting "OVERLAP" as the searching type. Check box 324 is a check box for selecting "TRAJECTORY" as the searching type. Searching button 338 is a button for instructing that the searching of the frame image to be confirmed is executed after selecting any searching types.

Returning the description back to the flowchart illustrated in FIG. 7, operation receiver 190 receives the input of the searching type selection operation for selecting any one of "AUTO", "OVERLAP", and "TRAJECTORY" as the searching type (step S410). Operation receiver 190 outputs the operation signal including the selected searching type (for example, "AUTO") to searching unit 200.

Next, searching unit 200 refers the tracking result information stored in tracking result information storage 180 and searches the frame number in which the setting value of the tracking state is identical to the searching type (for example, "AUTO") included in the operation signal output from operation receiver 190 (step S420). In a case where the value (for example, 5) is input to input box 326 in the searching screen illustrated in FIG. 8, searching unit 200 searches the frame number in which the setting value of the tracking state is identical to the searching type (for example, "AUTO") continuously in the number of the value input to input box 326 of the searching screen. Searching unit 200 outputs the searched frame number to display 210.

Next, display 210 displays the searching result screen including the frame image corresponding to the frame number output from searching unit 200 on display region 300 of the searching screen among the plurality of frame images which configure the sport video output from video input unit 110 (step S430).

Figure 9:
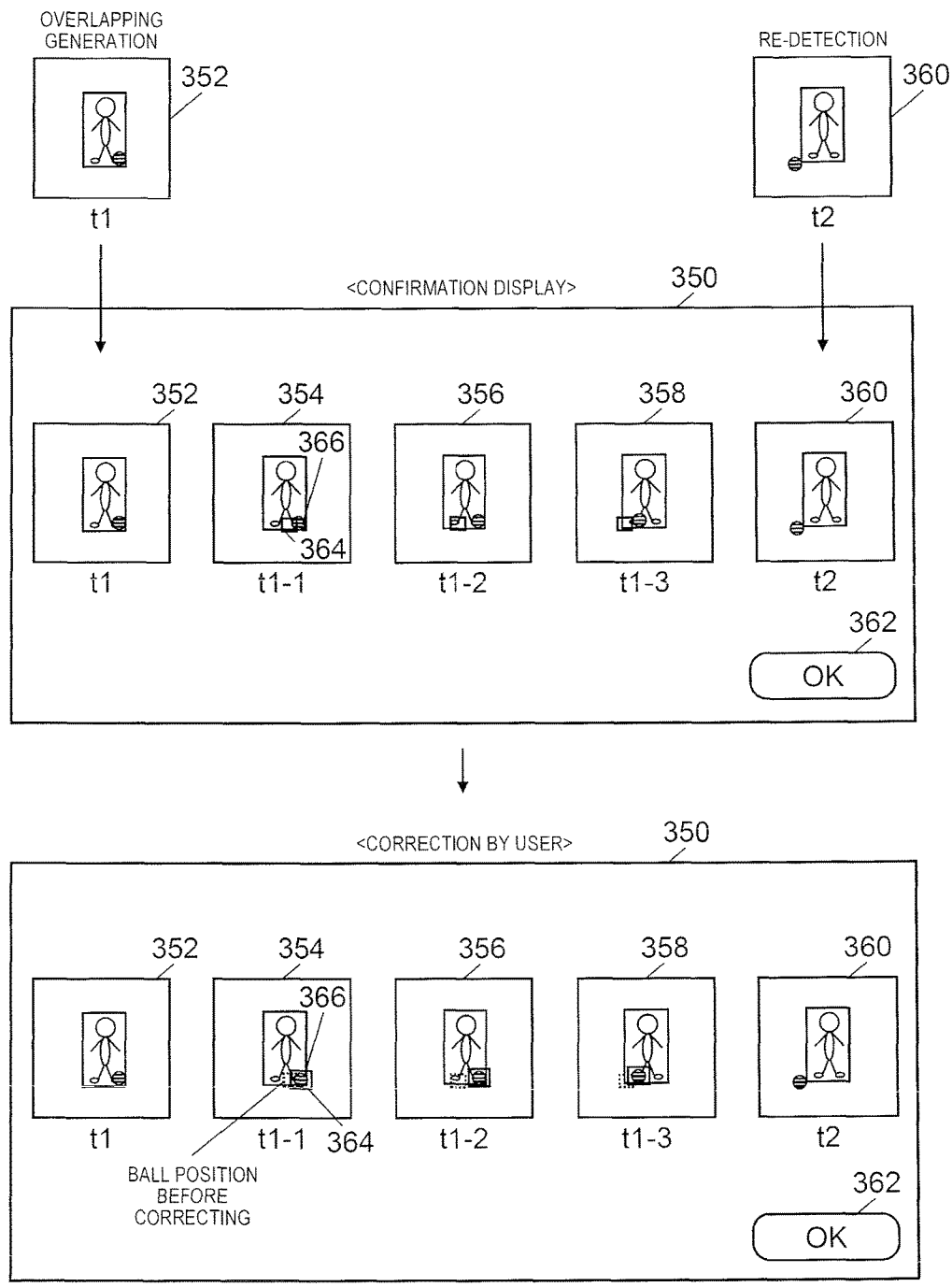
FIG. 9 is a diagram illustrating a searching result screen in the present exemplary embodiment.

FIG. 9 is a diagram illustrating a searching result screen in a case where the searching type is the "AUTO". In searching result screen 350, predetermined region 352 of a beginning frame image (hereinafter, referred to as a "beginning frame image") having a setting value of the tracking state of "AUTO" and predetermined 360 of a next frame image (hereinafter, referred to as a "frame image after ending") having the predetermined value of the tracking state is the "AUTO" are displayed in an enlarged manner. In addition to this, predetermined regions 354 to 358 of three frame image to be confirmed in which a portion of the frame image to be confirmed present between the beginning frame image and the frame image after ending is thinned are displayed in the enlarged manner. In the present exemplary embodiment, by applying a check sign to check boxy 328 (thinning display) if the searching screen by the user, a setting of the display can be performed by thinning a part of the searched frame image to be confirmed.

For example, a thinning interval is thinned out such that if the frame image to be confirmed is 30 or less, in-between three frames are displayed as illustrated in FIG. 9. On the other hand, if the frame number of the frame images to be confirmed is greater than 30 frames, for example, the thinning is performed such that one frame image to be confirmed is displayed to 10 frames. In addition, in a case where the number of the frame images to be confirmed is greater, five frame images to be confirmed may be displayed at 1 degree, and next five frame images to be confirmed may be displayed by the operation of a NEXT button (not illustrated) disposed in searching result screen 350. In the present exemplary embodiment, by inputting the arbitrary value (for example, 5) to input box 334 (the number of displays) of the searching screen, the user can set the display of the frame image to be confirmed at 1 degree only the number of the input value.

Predetermined region 352 to 360 are a region having a constant size which uses the ball position as a center included in the tracking result information. A player, a player region frame indicating the player region of the player, ball frame 364 indicating the ball position included in the tracking result information, and ball 366 are displayed on predetermined regions 354 to 358 of the frame image to be confirmed.

When the searching result screen is displayed by display 210, the user confirms whether ball 366 is entered in ball frame 364 in predetermined regions 354 to 358 of the frame image to be confirmed included in the searching result screen. If ball 366 is entered in ball frame 364, the position of ball 366 is correctly detected. Accordingly, since there is no need to correct the ball position in the frame image to be confirmed, the user presses OK button 362 which is disposed in searching result screen 350. On the other hand, if ball 366 is entered in ball frame 364, the position of ball 366 is wrongly detected, there is need to correct the ball position in the frame image to be confirmed. In an example illustrated in FIG. 9, since ball 366 is not entered in ball frame 364 in any of predetermined regions 354 to 358, there is no need to correct the ball position. In this case, the user clicks and operates the correct ball position within predetermined regions 354 to 358.

Corrector 220 corrects the ball position in the frame image to be confirmed in accordance with a click operation signal output from operation receiver 190. Display 210 updates and displays the position of ball frame 364 to the ball position after correcting, that is, a position which is clicked and operated, in predetermined regions 354 to 358 included in searching result screen 350. In searching result screen 350 which is illustrated in the lower part of FIG. 9, as a result of that the correction operation of the ball position is performed by the user, ball 366 is entered in ball frame 364 in any one of predetermined regions 354 to 358. The user confirms that ball 366 is entered in ball frame 364 and presses OK button 362 which is disposed in searching result screen 350. As a result, regarding the frame image to be confirmed corresponding to predetermined regions 354 to 358, corrector 220 updates the ball position included in the tracking result information to the ball position after correcting.

Returning the description back to the flowchart illustrated in FIG. 7, operation receiver 190 determines whether the input of the correction instruction operation for instructing that the ball position in the frame image to be confirmed is corrected is received (step S440). As a result of the determination, in a case where the input of the correction instruction operation is not received (step S440, NO), correcting and verifying device 100 terminates the process in FIG. 7. On the other hand, in a case where the input of the correction instruction operation is received (step S440, YES), regarding the frame image to be confirmed in which the correction instruction operation is received, corrector 220 updates the ball position included in the tracking result information to the ball position after correcting (step S450). In step S450, corrector 220 calculates the ball position in the frame image to be confirmed which is positioned in before and after the frame image to be confirmed in which the correction instruction operation is received among the searched frame images to be confirmed and in which the result of the thinning display is not displayed by interpolating process using the ball position in the frame image to be confirmed which is positioned in before and after the frame image to be confirmed in which correction instruction operation is received and in which the ball position cannot be corrected, and the corrected ball position. By using the calculated ball position, regarding the frame image to be confirmed in which the result of the thinning display cannot be displayed, the ball position included in the tracking result information is updated. Furthermore, regarding the frame image to be confirmed in which the ball position is updated, corrector 220 sets a character string "EDIT" to the tracking state included in the tracking result information. By finishing the process in step S450, correcting and verifying device 100 terminates the process in FIG. 7.

Figure 10:
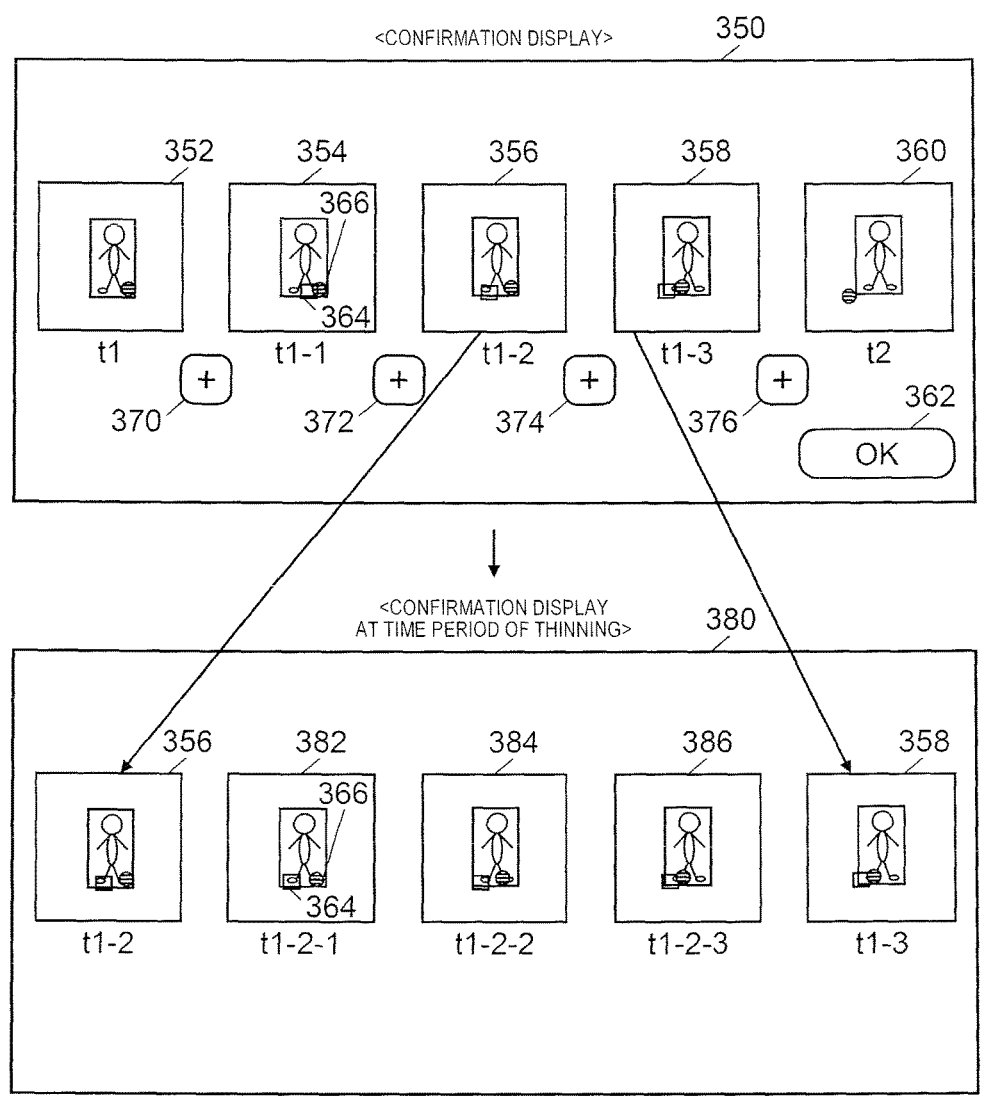
FIG. 10 is a diagram illustrating the searching result screen in the present exemplary embodiment.

In searching result screen 350, as illustrated in FIG. 10, + buttons (plus buttons) 370 to 376 may be disposed between the frame images to be confirmed which is thinned out and displayed. For example, in a case where the user performs an operation for pressing+ button 374, display 210 displays detail display screen 380 including predetermined regions 382 to 386 of the frame image to be confirmed present between the frame image to be confirmed corresponding to predetermined region 356 and the frame image to be confirmed corresponding to predetermined region 358. Display 210 updates pressed+ button 374 to − button (minus button). The user can grasp the correct position of ball 366 even in a case where the plurality of players are in contact with ball 366 and the motion of ball 366 is complicated by confirming detail display screen 380 displayed by display 210. The user confirms predetermined regions 382 to 386 of the frame image to be confirmed included in detail display screen 380, and as described above, the user can correct the ball position. That is, the user clicks and operates the correct ball position in predetermined regions 382 to 386. In a case where the user presses the − button which is updated from + button 374, display 210 terminates the display of detail display screen 380. Display 210 updates − button to + button 374.

In addition, display 210 may display entire the frame images to be confirmed present between the frame images to be confirmed which is thinned out and displayed when displaying searching result screen 350 by including the frame image to be confirmed to searching result screen 350 and can reproduce entire the frame image to be confirmed as a moving image. In a case where entire the frame images to be confirmed present between the frame images to be confirmed which is thinned out and displayed are reproduced as the moving image, the user applies a check sign to check box 330 (auto play) of the searching screen and presses and operates execution button 340. In this case, the user inputs the arbitrary value (for example, 2) to input box 336 (skip) of the searching screen. Therefore, while skipping the frame image to be confirmed by only the input number, the user can reproduce the moving image.

Figure 11:
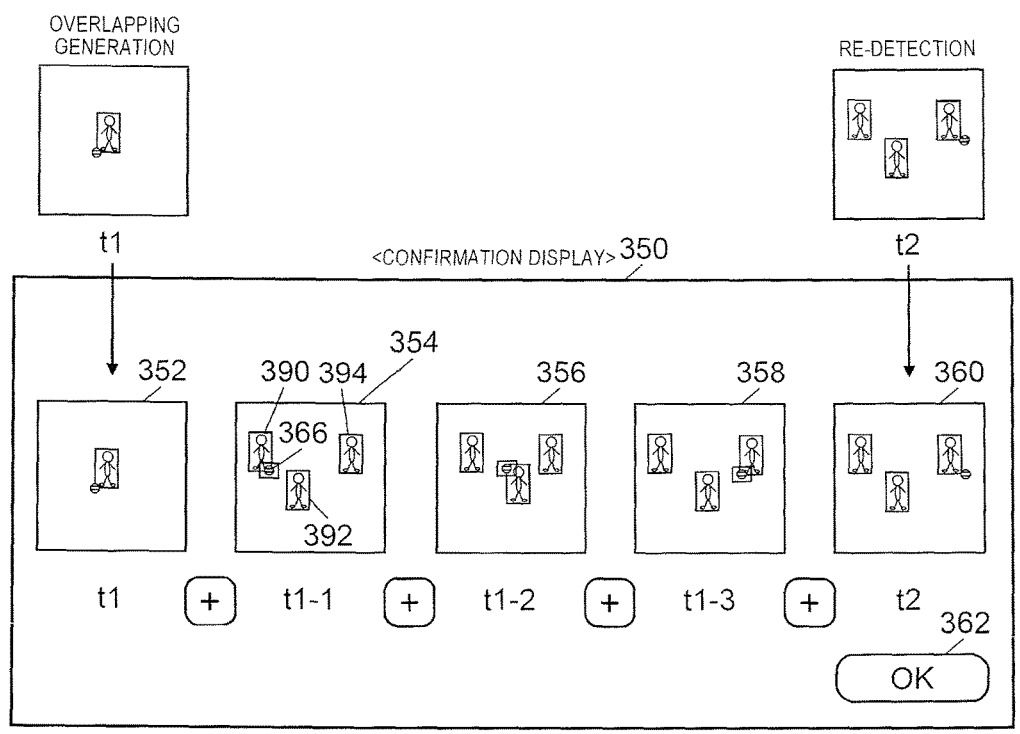
FIG. 11 is a diagram illustrating the searching result screen in the present exemplary embodiment.

In addition, in a case where a plurality of players having a possibility that the player is in contact with the ball in the frame image to be confirmed included in the searching result screen in a case where the searching type is the "AUTO" are present, as illustrated in FIG. 11, display 210 may display the region having the constant size including the entire the plurality of players 390 to 394 as predetermined regions 354 to 358. Display 210 determines whether the player region is overlapped in the frame image to be confirmed included in the searching result screen based on the player region output from player region detector 160 and specifies the plurality of players 390 to 394 which is determined that the player regions are overlapped as the plurality of player having a possibility that the player is in contact in ball 366.

Hereinabove, an example in which in a case where the searching type is the "AUTO", the frame image to be confirmed is searched and displayed, and the ball position is corrected in accordance with the correction instruction of the user is described. Hereinafter, an example in which in a case where the searching type is the "TRAJECTORY" or "OVERLAP", the frame image to be confirmed is searched and displayed, and the ball position is corrected in accordance with the correction instruction of the user will be described.

Firstly, a case where operation receiver 190 receives the input of the selection operation for selecting "TRAJECTORY" as the searching type will be described. In this case, operation receiver 190 outputs the operation signal including the selected searching type ("TRAJECTORY") to searching unit 200.

Searching unit 200 refers the tracking result information stored in tracking result information storage 180 and searches the frame number in which the setting value of the tracking state is identical to the searching type ("TRAJECTORY") included in the operation signal output from operation receiver 190. Searching unit 200 outputs the searched frame number to display 210.

Display 210 displays the searching result screen corresponding to the frame number output from searching unit 200 among the plurality of frame images which configures the sport video output from video input unit 110 on display region 300 of the searching screen. In the searching result screen, a predetermined region of the frame image (frame image to be confirmed) before than the frame image corresponding to the frame number output from searching unit 200 at several frame intervals. In the predetermined region, ball frame indicating the ball position in the frame image to be confirmed that is the ball position included in the tracking result information is displayed.

When the searching result screen is displayed by display 210, the user confirms whether the ball is entered in the ball frame in the predetermined region of the frame image to be confirmed included in the searching result screen. If the ball is entered in the ball frame, since the position of the ball is correctly detected, and there is no need to correct the ball position in the frame image to be confirmed the user presses the OK button which is disposed in the searching result screen. On the other hand, if the ball is entered in the ball frame, the position of the ball is wrongly detected, and there is need to correct the ball position in the frame image to be confirmed. In this case, the user correctly clicks and operates the ball position within the predetermined region.

Corrector 220 corrects the ball position in the frame image to be confirmed in accordance with the click operation signal output from operation receiver 190. That is, regarding the frame image to be confirmed corresponding to the predetermined region, corrector 220 updates the ball position included in the tracking result information to the ball position after correcting.

In addition, in a case where a check sign is applied to check box 332 (reverse tracking) of the searching screen illustrated in FIG. 8, and execution button 340 is pressed, ball candidate detector 120 and ball tracking unit 130 re-detect the position (first ball position) of the ball candidate region in the frame image (frame image to be confirmed) corresponding to the frame number before the frame number based on the ball position in the frame image corresponding to the frame number output from searching unit 200. In this manner, it is predicted that accuracy of the re-detected first ball position becomes comparatively high. The frame image in which the tracking state is the "TRAJECTORY" has a high possibility that the position of the first ball position is not corrected at a time point. In this manner, the frame image before the frame image in which the tracking state is the "TRAJECTORY" has also a high possibility that the position of the first ball position is corrected, in the same manner. Here, the frame image in which the tracking state is the "TRAJECTORY" has a high possibility that the second position is corrected at the time point. Accordingly, by re-detecting the position (first ball position) of the ball candidate region in the reverse direction with reference to the position of the second ball position, the possibility that the first ball position can be correctly set becomes higher. As illustrated in FIG. 12, display 210 displays searching result screen 400 including predetermined regions 402 to 410 of the frame image to be confirmed having a predetermined number (for example, 5) at the arbitrary frame interval (for example, a) among the plurality of frame images to be confirmed in which the first ball position is re-detected. Ball frame 450 and ball 460 indicating the re-detected first ball position are displayed on predetermined regions 402 to 410.

When searching result screen 400 is displayed by display 210, the user confirms whether ball 460 is entered in ball frame 450 in predetermined regions 402 to 410 of the frame image to be confirmed included in searching result screen 400. If ball 460 is entered in ball frame 450, the position of ball 460 is correctly detected. Accordingly, since there is no need to correct the ball position in the frame image to be confirmed, the user presses OK button 440 which is disposed in searching result screen 400. Regarding the frame image to be confirmed corresponding to predetermined regions 402 to 410, corrector 220 updates the ball position included in the tracking result information to the re-detected first ball position. In the example in FIG. 12, since ball 460 is entered in ball frame 450 in also any of predetermined regions 402 to 410, there is no need to correct the ball position.

On the other hand, if ball 460 is entered in ball frame 450, the position of ball 460 is wrongly detected, there is need to correct the ball position in the frame image to be confirmed. In this case, the user clicks and operates the correct ball position within predetermined regions 402 to 410. Corrector 220 corrects the ball position in the frame image to be confirmed in accordance with a click operation signal output from operation receiver 190.

Display 210 updates and displays the position of ball frame 450 to the ball position after correcting, that is, a position which is clicked and operated, in predetermined regions 402 to 410 included in searching result screen 400. The user confirms that ball 460 is entered in ball frame 450 and presses OK button 440 which is disposed in searching result screen 400. Regarding the frame image to be confirmed corresponding to predetermined regions 402 to 410, corrector 220 updates the ball position included in the tracking result information to the ball position after correcting.

In addition, by pressing Prev button 430 which is disposed in searching result screen 400 by the user, searching result screen 400 in which predetermined regions 412 to 420 of frame image to be confirmed having a small frame number than the frame image to be confirmed corresponding to predetermined regions 402 to 410 are included can be displayed. As illustrated in searching result screen 400 illustrated in a lower part of FIG. 12, on predetermined regions 418 and 420, ball frame 470 indicating the finally detected first ball position is displayed in addition to ball frame 450 and ball 460 indicating the re-detected first ball position. That is, the user confirms that the first ball position which is firstly detected on predetermined regions 418 and 420 is different from the re-detected first ball position, and the user performs the correction instruction as described in step S440, as necessary. When the predetermined number of the frame images in which the first ball position which is firstly detected as predetermined regions 416, 414, and 412 and the re-detected first ball position are overlapped are continued, since it is assumed that it is clear that the first ball position which is firstly detected previously seems to some degree certainly, the user terminates the display of searching result screen 400 by pressing OK button 440. Here, the determination whether the first ball position which is firstly detected and the and the re-detected first ball position are in the predetermined range is determined by ball position calculation output unit 170, only the frame image that is in the outside the predetermined range may be displayed.

Next, a case where operation receiver 190 receives the input of the selection operation for selecting "OVERLAP" as the searching type will be described. In this case, operation receiver 190 outputs the operation signal including the selected searching type ("OVERLAP") to searching unit 200.

Searching unit 200 refers the tracking result information stored in tracking result information storage 180 and searches the frame number in which the setting value of the tracking state is identical to the searching type ("OVERLAP") included in the operation signal output from operation receiver 190. Searching unit 200 outputs the searched frame number to display 210.

Display 210 displays the searching result screen corresponding to the frame number output from searching unit 200 among the plurality of frame images which configures the sport video output from video input unit 110 on display region 300 of the searching screen. In the searching result screen, a predetermined region of the frame image (frame image to be confirmed) before than the frame image corresponding to the frame number output from searching unit 200 and in which the setting value of the tracking state is the "OVERLAP" is included. In the predetermined region, ball frame indicating the ball position in the frame image to be confirmed that is the ball position included in the tracking result information is displayed.

When the searching result screen is displayed by display 210, the user confirms whether the ball is entered in the ball frame in the predetermined region of the frame image to be confirmed included in the searching result screen. If the ball is entered in the ball frame, since there is no need to correct the ball position in the frame image to be confirmed, the user presses the OK button which is disposed in the searching result screen. On the other hand, if the ball is entered in the ball frame, there is a need to correct the ball position in the frame image to be confirmed. In this case, the user correctly clicks and operates the ball position within the predetermined region.

Corrector 220 corrects the ball position in the frame image to be confirmed in accordance with the click operation signal output from operation receiver 190. That is, regarding the frame image to be confirmed corresponding to the predetermined region, corrector 220 updates the ball position included in the tracking result information to the ball position after correcting.

In the tracking result information which is output to tracking result information storage 180 by ball position calculation output unit 170, there is a high possibility that the frame image in which the tracking state is the "TRAJECTORY" is present after than the frame image in which the tracking state is "OVERLAP". The reason is that in a case where the tracking state is the "OVERLAP", a possibility that the correction is performed by the second ball position in the frame image thereafter becomes higher, and in a case where the tracking state becomes the "TRAJECTORY". Therefore, in a case where the user performs the correction process, there is a high possibility that the correction process is efficiently performed by selecting the "TRAJECTORY" to the searching type rather than that the correction process is performed by selecting the "OVERLAP" to the searching state.

As detailed described in above, in the present exemplary embodiment, the processor displays the specific frame image as the frame image to be confirmed based on the tracking result of the moving body in each of the plurality of frame images which configure the video, and corrects the position of the moving body in the frame image to be confirmed in a case of receiving the correction instruction of the user.

According to the present exemplary embodiment which is configured in this manner, the user can confirm only the frame image to be confirmed which is searched and displayed based on the tracking result information and correct the position of the ball as needed, without confirming whether the ball to be tracked is correctly tracked for entire the frame images. Therefore, work load when the position of the ball to be tracked in the frame image can be reduced.

In the present exemplary embodiment, a check box for selecting "EDIT (frame image in which the ball position is corrected)" as the searching type may further provided on searching condition setting region 310 of the searching screen. In addition, a front searching button and a rear searching button for displaying the frame image in which the setting value of the tracking state is identical to the selected searching type (for example, "AUTO") with reference to the frame image to be confirmed included in the searching result screen during displaying by the front searching may be further provided on searching condition setting region 310 of the searching screen.

In addition, in the present exemplary embodiment, a method for confirming and correcting by selecting any one type as the searching type is described. However, the confirmation and the correction of the two or more searching types in a time may be performed at the same time series by selecting two or more of the searching types.

In addition, in the present exemplary embodiment, the OK button, the searching button, the execution button, the Prev button, and the like are disposed on the screen, and when pressing the buttons, although described above, various types of the functions may be allocated to a key of a keyboard, for example, a function key.

In addition, in the present exemplary embodiment, an example in which a configuration for detecting the position of the ball in each of the plurality of frame images which configure the video and a configuration for correcting the position detection result of the ball in the frame image to be confirmed in a case of receiving the correction instruction of the user which searches and displays the frame image to be confirmed are integrated in one device is described. However, the configurations are separately formed in different devices.

In addition, in the present exemplary embodiment, an example in which correcting and verifying device 100 tracks the ball in the sport video in which the soccer game is imaged is described. However, correcting and verifying device 100 may track the moving body to be used in the game in the sport video in which the other sport games are imaged. In addition, correcting and verifying device 100 may track the moving body in the video other than the sport video.

Furthermore, the present exemplary embodiment is a mere example of embodying for carrying out the present disclosure, and the technical range of the present disclosure should not be construed limitedly on the basis thereof. In other words, the present disclosure can be carried out in various configurations without departing from the gist or main features thereof.

INDUSTRIAL APPLICABILITY

The present disclosure is useful as a correcting and verifying method and a correcting and verifying device which can reduce work load when confirming and correcting a position of a moving body to be tracked in a frame image.

The invention claimed is:

1. A correcting and verifying method, comprising:
causing a processor to display a specific frame image as a frame image to be confirmed based on a tracking result of a moving body in each of a plurality of frame images that configure a video; and
causing the processor to correct a position of the moving body in the frame image to be confirmed in a case where a correction instruction of a user is received,
wherein the processor determines whether the position of the moving body can be normally detected to set the tracking result,
the processor displays a searching type that indicates a plurality of tracking results, and
the processor displays the frame image to be confirmed based on the tracking result that is selected by the user based on the searching type.

2. The correcting and verifying method of claim 1,
wherein, in a case where the moving body is not included in a region having a certain size which uses the other moving body as a center, the processor determines that the position of the moving body can be normally detected, and in a case where the moving body is included in the region, the processor determines that the position of the moving body cannot be normally detected.

3. The correcting and verifying method of claim 2,
wherein the video is a sport video in which a sport game is imaged,
the moving body is a ball to be used in the sport game, and the other moving body is a player of the sport.

4. The correcting and verifying method of claim 3,
wherein the processor displays a part of the frame image to be confirmed, that is, a region including the position of the moving body in an enlarged manner.

5. The correcting and verifying method of claim 1,
wherein the processor displays frame images before and after the frame image to be confirmed.

6. The correcting and verifying method of claim 1,
wherein the processor calculates the position of the moving body in the frame image to be confirmed through an interpolating process using the position detecting result of the moving body in the frame image other than the frame image to be confirmed, and corrects the position of the moving body using the calculation result.

7. The correcting and verifying method of claim 1,
wherein the processor detects a trajectory of the moving body based on the image obtained by using the plurality of frame images, and displays the frame image before the frame image corresponding to the position of the moving body which is obtained from the detected trajectory as the frame image to be confirmed.

8. The correcting and verifying method of claim 7,
wherein the processor detects the position of the moving body in the frame image to be confirmed using the position of the moving body which is obtained from the trajectory, and displays the detected position.

9. The correcting and verifying method of claim 1,
wherein, in a case where the plurality of frame images to be confirmed are present, the processor thins out and displays at least one or more of the frame images to be confirmed.

10. The correcting and verifying method of claim 1,
wherein, in a case where the plurality of frame images to be confirmed are present and an instruction of a user is received, the processor thins out and displays at least one or more of the frame images to be confirmed.

11. The correcting and verifying method of claim 1,
wherein the processor displays a position of the moving body before correcting in the frame image to be confirmed.

12. A correcting and verifying device comprising:
a processor;
a display; and
an operation receiver,
wherein the processor causes the display to display a specific frame image as a frame image to be confirmed based on a tracking result of a moving body in each of a plurality of frame images that configure a video,
the processor receives a correction instruction from a user,
in a case where the correction instruction is received from the operation receiver, the processor corrects the position of the moving body in the frame image to be confirmed,
the processor determines whether the position of the moving body can be normally detected to set the tracking result,
the processor displays a searching type that indicates a plurality of tracking results, and
the processor displays the frame image to be confirmed based on the tracking result that is selected by the user based on the searching type.

13. The correcting and verifying device of claim 12,
wherein, in a case where the moving body is not included in a region having a certain size which uses the other moving body as a center, the processor determines that the position of the moving body can be normally detected, and in a case where the moving body is included in the region, the processor determines that the position of the moving body cannot be normally detected.

14. The correcting and verifying device of claim 13,
wherein the video is a sport video in which a sport game is imaged,
the moving body is a ball to be used in the sport game, and the other moving is a player of the sport.

15. The correcting and verifying device of claim 14, wherein the processor displays a part of the frame image to be confirmed, that is, a region including the position of the moving body on the display in an enlarged manner.

16. The correcting and verifying device of claim 12, wherein the processor displays frame images before and after the frame image to be confirmed.

17. The correcting and verifying device of claim 12, wherein the processor calculates the position of the moving body in the frame image to be confirmed through an interpolating process using the position detecting result of the moving body in the frame image other than the frame image to be confirmed, and corrects the position of the moving body using the calculation result.

18. The correcting and verifying device of claim 12, wherein the processor detects a trajectory of the moving body based on the image obtained by using the plurality of frame images, and displays the frame image before the frame image corresponding to the position of the moving body which is obtained from the detected trajectory on the display as the frame image to be confirmed.

19. The correcting and verifying device of claim 18, wherein the processor detects the position of the moving body in the frame image to be confirmed using the position of the moving body which is obtained from the trajectory, and displays the detected position on the display.

20. The correcting and verifying device of claim 12, wherein, in a case where the plurality of frame images to be confirmed are present, the processor thins out and displays at least one or more of the frame images to be confirmed on the display.

21. The correcting and verifying device of claim 12, wherein, in a case where the plurality of frame images to be confirmed are present and an instruction of a user is received, the processor thins out and displays at least one or more of the frame images to be confirmed on the display.

22. The correcting and verifying device of claim 12, wherein the processor displays a position of the moving body before correcting in the frame image to be confirmed on the display.

* * * * *